United States Patent [19]
Nishiguchi

[11] Patent Number: 5,241,378
[45] Date of Patent: Aug. 31, 1993

[54] FLATBED-TYPE APPARATUS AND METHOD FOR READING BOTH POSITIVE AND NEGATIVE COLOR FILM

[75] Inventor: Naokatsu Nishiguchi, Kyoto, Japan

[73] Assignee: Dainippon Screen Mfg. Co., Ltd., Japan

[21] Appl. No.: 684,165

[22] Filed: Apr. 11, 1991

[30] Foreign Application Priority Data
  Apr. 19, 1990 [JP] Japan .................. 2-103352

[51] Int. Cl.⁵ .............................. H04N 1/46
[52] U.S. Cl. ......................... 358/500; 358/527; 358/515
[58] Field of Search ................ 358/75–80, 358/214–216

[56] References Cited

U.S. PATENT DOCUMENTS 4,553,835  11/1985  Morgan, Jr. ................ 358/76
4,681,427  7/1987  Plummer .................... 358/75
4,797,711  1/1989  Sasada et al. ............... 355/32

Primary Examiner—Stephen Brinich
Attorney, Agent, or Firm—Ostrolenik, Faber, Gerb & Soffen

[57] ABSTRACT

A flatbed-scanning type image reading apparatus for reading an image of an original color film by separating the image into a plurality of color components, the apparatus including a transparent original table having a flat surface on which an original color film is to be placed; a linear light source for emitting the original color film placed on the table at least over a main scanning scope; an optical image reading unit for reading a light transmitted through the original color film as a plurality of color components of different wavelengths; a sub-scanning moving unit for relatively moving the linear light source and the table in a sub-scanning direction; an optical filter having spectral characteristics substantially inverse to spectral characteristics of a base of a negative color film; and a filter switching unit for moving the optical filter selectively to a first position on an optical path between the linear light source and the table and a second position off the optical path in accordance with the type of the original color film placed on the table.

21 Claims, 12 Drawing Sheets

FLATBED-TYPE APPARATUS AND METHOD FOR READING BOTH POSITIVE AND NEGATIVE COLOR FILM

BACKGROUND OF THE INVENTION (1) Field of the Invention

This invention relates to a flatbed-scanning type image reading apparatus and method for reading an image of an original color film by separating the light transmitted through the image into a plurality of color components.

(2) Description of the Prior Art

Among conventional color image scanning apparatuses are a drum-type apparatus and a flatbed-scanning type apparatus.

In the drum-type apparatus, an original color film which is provided on a peripheral surface of a drum and is rotated together with the drum, is photoelectrically picked up by a pickup head moving in an axial direction of the drum, and is separated into components of the three primary colors of blue (B), green (G) and red (R).

In the flatbed-scanning type apparatus, an original color film placed on a transparent table is photoelectrically read by a horizontally movable reading head which is equipped with a CCD line sensor, and is separated into components of the three primary colors.

Although a positive color film (reversal film) is generally used as an original film in the above color image reading apparatuses, a negative color film is also used mainly in the newspaper industry. This fact demands an image reading apparatus for reading both positive and negative color films. Further, reddish fogging, which is inevitable for a developed negative color film due to the color of the base thereof, should be prevented from adversely influencing color image reading accuracy.

In view of the above requirements, the conventional drum-type apparatus is equipped with circuitry for electrically compensating the color of the base of the negative film.

Since the drum-type apparatus employs a photomultiplier as a photoelectric converter in a pickup head, an enough dynamic range can be obtained with little possibility of getting noise. Accordingly, the use of the above circuitry has no adverse influence on the pickup accuracy.

In the case of the flatbed-scanning type apparatus, however, the use of the above circuitry hampers the reading accuracy for the following reason. This type of reading apparatus mainly employs a CCD line sensor. Since the CCD line sensor does not have an enough dynamic range in the reading head, the output level of the CCD line sensor is often substantially the same as the noise level when a highly dense image is read. Accordingly, amplifying the output may result in erroneously getting noise.

The image reading accuracy is especially low for the blue component when a halogen lamp is used as the light source, for the following reason. The intensity of the light transmitted through the negative color film is lower than that transmitted through the positive color film. The problem is that the difference between the light intensity through the negative film and that through the positive film is varied depending on the color component due to the reddish fogging: largest for blue and smallest for red.

The use of the above circuitry has another problem of complicating and enlarging the construction and increasing the manufacturing cost of the apparatus.

SUMMARY OF THE INVENTION

Accordingly, this invention has an object of offering a flatbed-scanning type image reading apparatus and method for reading an image of a negative color film while optically compensating the adverse influence of the reddish fogging.

This invention has another object of offering a flatbed-scanning type image reading apparatus for reading an image of both positive and negative color films in an optimum condition by switching an optical device.

This invention has still another object of offering a flatbed-scanning type image reading apparatus which is suitable for reading an image of a negative color film using a CCD line sensor which does not have an enough dynamic range in a reading head.

The above objects are fulfilled by a flatbed-scanning type image reading apparatus for reading an image of an original color film by separating the image into a plurality of color components, the apparatus comprising a transparent original table having a flat surface on which an original color film is to be placed; a linear light source for emitting the original color film placed on the table at least over a main scanning scope; an optical image reading unit for reading a light transmitted through the original color film as a plurality of color components of different wavelengths; a sub-scanning moving unit for relatively moving the linear light source and the table in a sub-scanning direction; an optical filter having spectral characteristics substantially inverse to spectral characteristics of a base of a negative color film; and a filter switching unit for moving the optical filter selectively to a first position on an optical path between the linear light source and the table and a second position off the optical path in accordance with the type of the original color film placed on the table.

The optical image reading unit may further comprise a color separating unit for separating the light transmitted through the original color film into color components of the three primary colors of blue, green and red and a photoelectric converting unit for converting each color component into an electric signal.

The color separating unit may be a dichroic prism, and the photoelectric converting unit may be three CCD line sensors.

The sub-scanning moving unit may be controlled to relatively move the linear light source and the table in the sub-scanning direction in association with a speed with which the optical image reading unit reads all the color components.

The optical filter may be movable in the subscanning direction between the linear light source and the table.

The filter switching unit may pivot the optical filter selectively to the first position and the second position in accordance with the type of the original color film on the table.

The above apparatus may further comprise a light intensity adjusting unit for adjusting an intensity of the light running from the linear light source in association with the position of the optical filter.

The light intensity adjusting unit may be an attenuation filter, which is controlled to be on the optical path between the linear light source and the table when the optical filter is at the second position.

The light intensity adjusting unit may be a member having a slit, the member being controlled to locate the slit on the optical path between the linear light source and the table when the optical filter is at the second position.

The light intensity adjusting unit may be a slit size adjusting unit for adjusting a slit size to a first size when the optical filter is at the first position and to a second size when the optical filter is at the second position.

The above apparatus may further comprise a white reference plate provided above the table, the white reference plate having an unexposed but developed negative color film when the original color film on the table is negative.

The above objects are also fulfilled by a flatbed-scanning type image reading apparatus for reading an image of an original color film by separating the image into a plurality of color components, the apparatus comprising a transparent original table having a flat surface on which an original color film is to be placed; a linear light source for emitting the original color film placed on the table at least over a main scanning scope; an optical image reading unit for reading a light transmitted through the original color film as color components of the three primary colors; a sub-scanning moving unit for relatively moving the linear light source and the table in a sub-scanning direction; an optical filter having spectral characteristics substantially inverse to spectral characteristics of a base of a negative color film; a filter switching unit for moving the optical filter to a first position on an optical path between the linear light source and the table when the original color film on the table is negative and to a second position off the optical path when the original color film on the table is positive; and a light intensity adjusting unit for substantially equalizing an intensity of the light incident on the optical image reading unit obtained when the original color film on the table is positive and the intensity of the above light obtained when the original color film on the table is negative with the optical filter located at the first position.

The above objects are also fulfilled by a flatbed-scanning type image reading apparatus for reading an image of an original color film by separating the image into a plurality of color components, the apparatus comprising a transparent original table having a flat surface on which an original color film is to be placed; a linear light source for emitting the original color film placed on the table at least over a main scanning scope; an optical image reading unit for reading a light transmitted through the original color film as color components of the three primary colors; a sub-scanning moving unit for relatively moving the linear light source and the table in a sub-scanning direction; a first optical filter having spectral characteristics substantially inverse to spectral characteristics of a base of a negative color film; a second optical filter for adjusting an intensity of the light incident on the optical image reading unit when the original color film on the table is positive; and a filter switching unit for locating the first optical filter on the optical path between the linear light source and the table when the original color film on the table is negative and for locating the second optical filter on the optical path when the original color film on the table is positive.

The second optical filter may be an ND filter.

The above objects are also fulfilled by a method of reading an image of an original color film in a flatbed-scanning type image reading apparatus, the method comprising the steps of setting an original color film on an original table; locating an optical filter having spectral characteristics substantially inverse to spectral characteristics of a base of a negative color film on an optical path between a linear light source and the table when the original color film on the table is negative, and retracting the optical filter off the optical path when the original color film on the table is positive; and relatively moving the linear light source and the table in a sub-scanning direction to read the image of the original color film on the table.

The above method may further comprise the step of reading a white reference plate provided above the table.

The above objects are also fulfilled by a method of reading an image of an original color film in a flatbed-scanning type image reading apparatus, the method comprising the steps of setting an original color film on an original table; locating a first optical filter having spectral characteristics substantially inverse to spectral characteristics of a base of a negative color film on an optical path between a linear light source and the table when the original color film on the table is negative, and locating a second optical filter on the optical path when the original color film on the table is positive; and relatively moving the linear light source and the table in a sub-scanning direction to read the image of the original color film on the table.

According to the above constructions, when a negative color film is placed on the table, the optical filter, which has the substantially inverse spectral characteristics to those of the negative color film, is located on the optical path by a filter switching unit. Owing to the optical filter, the spectral characteristics of the three color components of the incident light on the CCD line sensors can be compensated to be substantially the same as those of the color components obtained when a positive color film is on the table.

An excellent reading accuracy of the negative color film can be obtained only by employing an optical filter which has the optimum spectral characteristics for reading the positive color film with consideration of the spectral characteristics of a linear light source and the CCD line sensors.

In addition, the above function is obtained without providing circuitry for electrically compensating the color of the base of the negative film. As a result, both the size and the manufacturing cost of the apparatus are reduced.

If an unexposed but developed negative color film is used for a white reference plate when the original color film on the table is negative, highly accurate shading compensation is obtained. Such shading compensation realizes a high reading accuracy even if CCDs of the CCD line sensors are diversified in the sensitivity or even if the light from the linear light source are incident on the CCD line sensors in various intensities.

BRIEF DESCRIPTION OF THE DRAWINGS

These and other objects, advantages and features of the invention will become apparent from the following description thereof taken in conjunction with the accompanying drawings which illustrate specific embodiments of the invention. In the drawings:

FIGS. 12-13b are perspective views of lamp units of sixth and seventh embodiments according to this invention.

DESCRIPTION OF THE PREFERRED EMBODIMENTS

Embodiment I

A first embodiment of the present invention will be described referring to FIGS. 1 through 6.

Figure 1:
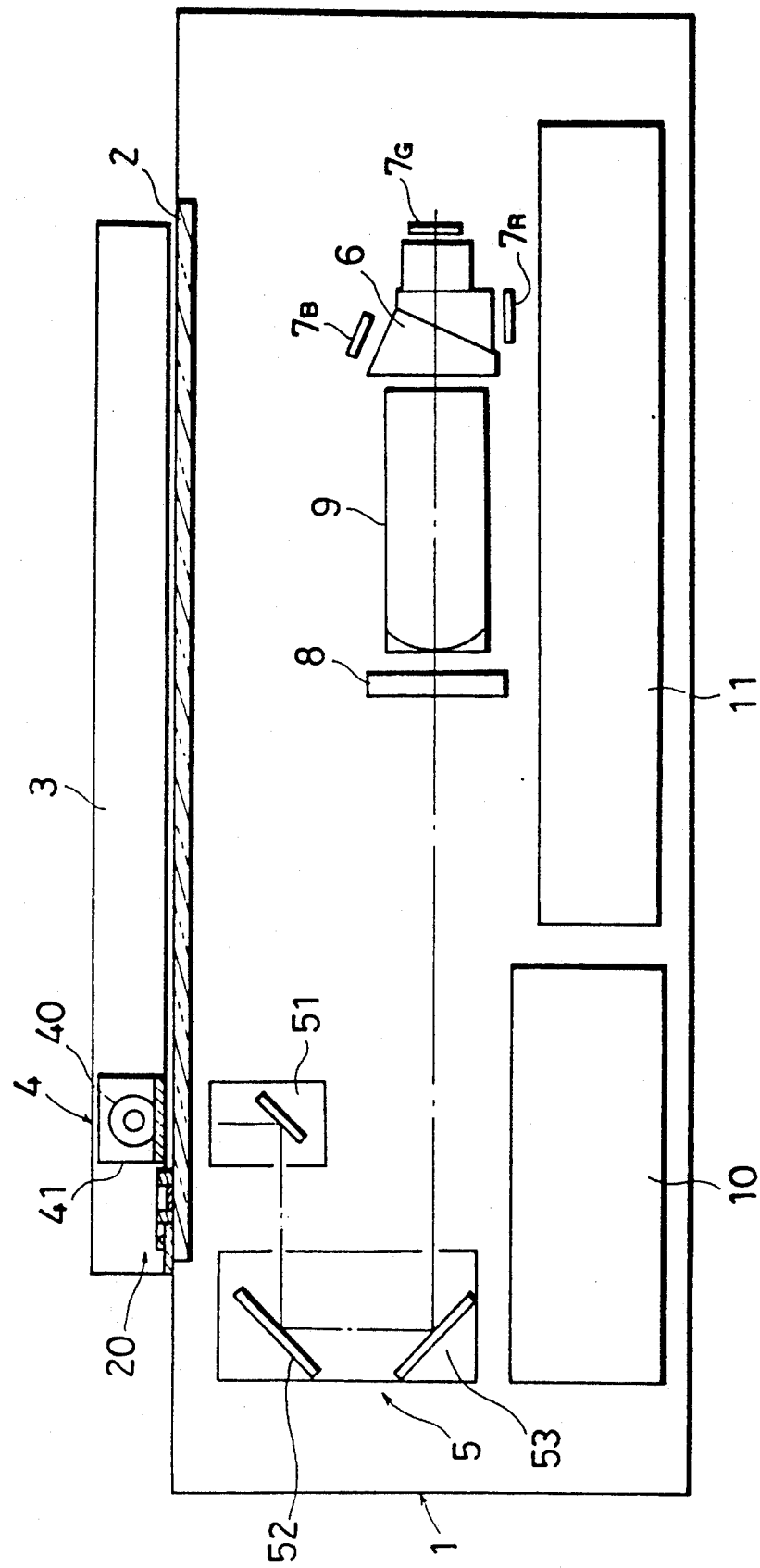
FIG. 1 is a cross sectional view of a first embodiment according to this invention.

As shown in FIG. 1, a flatbed-scanning type image reading apparatus comprises a rectangular parallelopiped main body 1. Provided on an upper ceiling of the main body 1 is a transparent original table 2, on an upper surface of which a positive or a negative color film having an original thereon is to be set. The table 2 is covered with an open/close cover 3 for protecting the table 2 from foreign substances such as dust.

Provided above the table 2 is a lamp unit 4 including a linear light source 40 for emitting the color film placed on the table 2. The lamp unit 4 is reciprocated in sub-scanning directions (right to left and vice versa in FIG. 1) by a driving unit (not shown) comprising a belt and pulley mechanism.

Provided below the table 2 is an optical image reading unit comprising a mirror system 5, a dichroic prism 6, a B-CCD line sensor $7_B$, a G-CCD line sensor $7_G$, and an R-CCD line sensor $7_R$. The mirror system 5 includes first, second and third mirrors 51, 52 and 53.

The above optical image reading unit functions as follows. A light running from the linear light source 40 through the color film placed on the table 2 is directed toward the dichroic prism 6 by the mirrors 51, 52 and 53. The dichroic prism 6 separates the light into components of the three primary colors of blue, green and red. The color components are supplied to the CCD line sensors $7_B$, $7_G$ and $7_R$, respectively. Each of the sensors reads the color component as a one-line image data through a photoelectric conversion. The obtained one-line image data is subjected to a specified processing carried out by an image processing apparatus (not shown) which is connected to the main body 1, thereafter the image data is sent to an output apparatus (not shown) for recording.

The flatbed-scanning type image reading apparatus further comprises an infrared cutting filter 8 and a zoom lens unit 9 provided on an optical path between the mirror system 5 and the dichroic prism 6. The filter 8 is provided for removing an infrared component from the light and thus preventing the infrared component from entering the CCD line sensors $7_B$, $7_G$ and $7_R$ as noise. The zoom lens unit 9 is reciprocated on the optical path in accordance with the image reading magnification.

The spectral characteristics of the light transmitted through the dichroic prism 6 is selected with consideration of the spectral characteristics of the linear light source 40, the CCD line sensors $7_B$, $7_G$ and $7_R$ and the zoom lens unit 9. Practically, a dichroic prism which causes the above light to have the spectral characteristics that allow the CCD line sensors $7_B$, $7_G$ and $7_R$ to get substantially equal white levels as shown in FIG. 3b is employed. The white level means the output level obtained when the CCD line sensors $7_B$, $7_G$ and $7_R$ each detect the light transmitted through a highlighted portion of a positive color film.

The main body 1 further contains a power supply 10 in a bottom left portion thereof (FIG. 1) and a printed circuit board 11 for operation control to the right of the power supply 10.

DETAILED DESCRIPTION OF THE LAMP UNIT 4

Figure 2A:
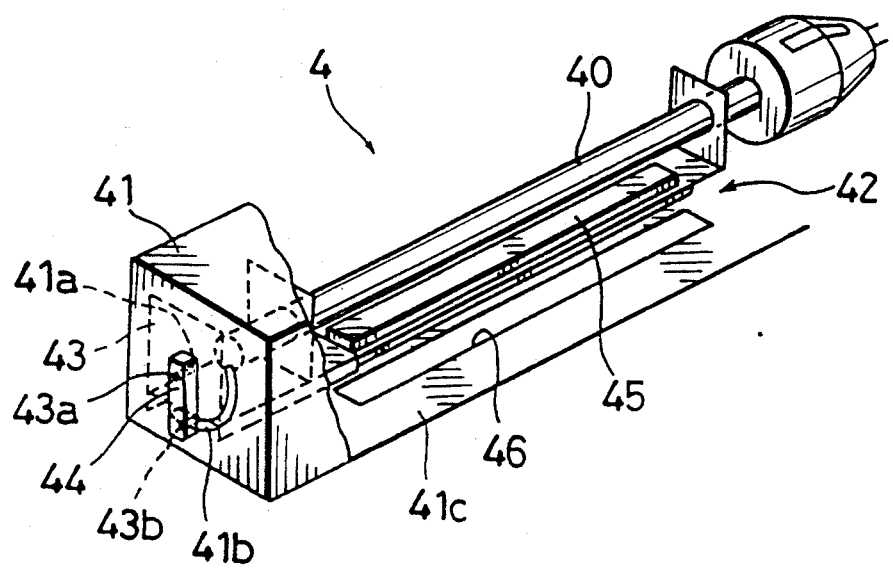
FIGS. 2a and 2b are perspective views of a lamp unit 4.
Figure 2B:
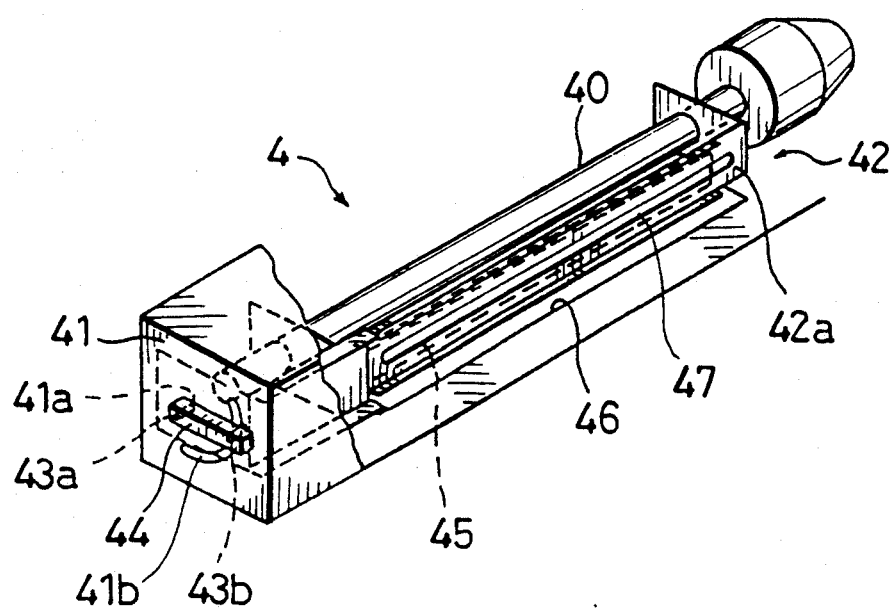

As illustrated in FIGS. 2a and 2b, the lamp unit 4 comprises the linear light source 40 having a halogen lamp at a rear end thereof and a holder 41 encasing the light source 40 with the halogen lamp.

The holder 41 has a rectangular shape extended in a main scanning direction, and also has two holes 41a and 41b on a front wall thereof. The light source 40 is encased in the holder 41 through a substantially C-shaped connecting frame 42 attached to the light source 40. The connecting frame 42 has a connecting piece 43 at a front end thereof, the connecting piece 43 having externally projecting pins 43a and 43b.

As shown in FIG. 2a, the projecting pin 43a is coaxial with the light source 40 and is rotatably inserted into the hole 41a. The hole 41b is curved with the hole 41a as the center of curvature. A tip of the projecting pin 43a is in contact with an operation lever 44, which is to be rotated by an operator. In this construction, the light source 40 is rotatable around a horizontal axis thereof, and the connecting frame 42 is rotatable around the light source 40. The rear end of the light source 40 is rotatably supported by an appropriate mechanism.

As in FIG. 2b, a bottom surface 42a of the connecting frame 42 has a filter 45 attached on an inner surface of a portion thereof, the portion being opposed to the light source 40. The above portion has a slit 47 of a size corresponding to that of the filter 45. A bottom surface 41c of the holder 41 has a slit 46 in a portion opposed to the light source 40.

The lamp unit 4 having the above construction is operated in the following way.

When the lever 44 is rotated from the position shown in FIG. 2a to the position shown in FIG. 2b, the connecting frame 42 is guided along the hole 41b, thus rotating in the same direction as the lever 44 is. In FIG. 2a, the light running from the light source 40 through the slit 46 inevitably passes through the filter 45 (the position of the filter 45 in FIG. 2a will be referred to as the functioning position, hereinafter); and in FIG. 2b, the light passes through the slit 46 with no obstruction (the position of the filter 45 in FIG. 2b will be referred to as the retracting position, hereinafter).

When the color film placed on the table 2 is positive, the filter 45 is at the retracting position. When the color film is negative, the filter 45 is at the functioning position, whereby the light from the light source 40 passes through the filter 45 and through the color film, and then is detected by the CCD line sensors $7_B$, $7_G$ and $7_R$.

ADVANTAGE OF EMPLOYING THE FILTER 45

The filter 45 is pale bluish purple and is used for preventing the adverse influence of the reddish fogging.

Figure 3A:
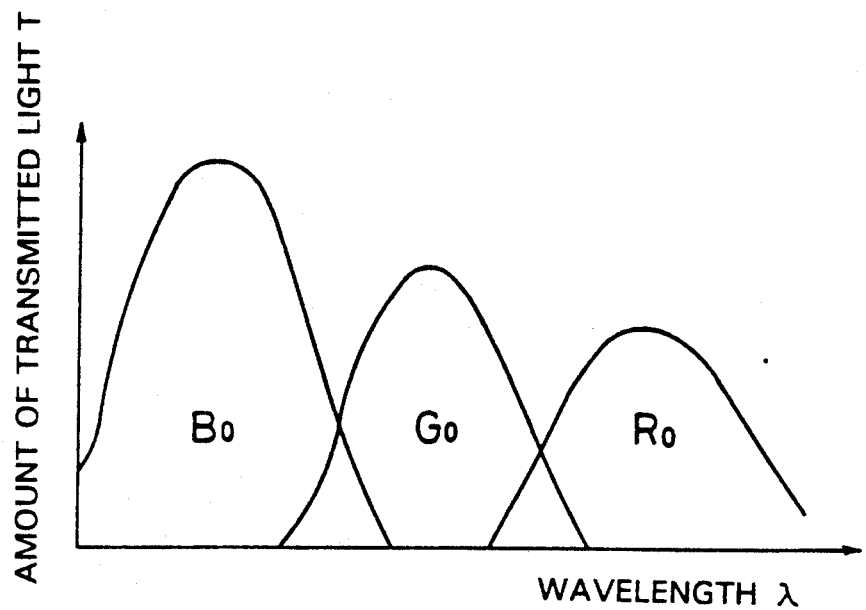
FIG. 3a is a graph showing spectral characteristics of the light transmitted through a dichroic prism 6 obtained by using a halogen lamp as a light source when a positive color film is read.
Figure 3B:
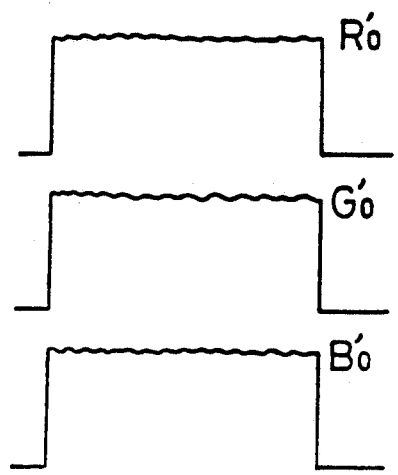
FIG. 3b shows white levels of CCD line sensors 7B, 7G and 7R obtained when the positive color film is read.
Figure 4A:
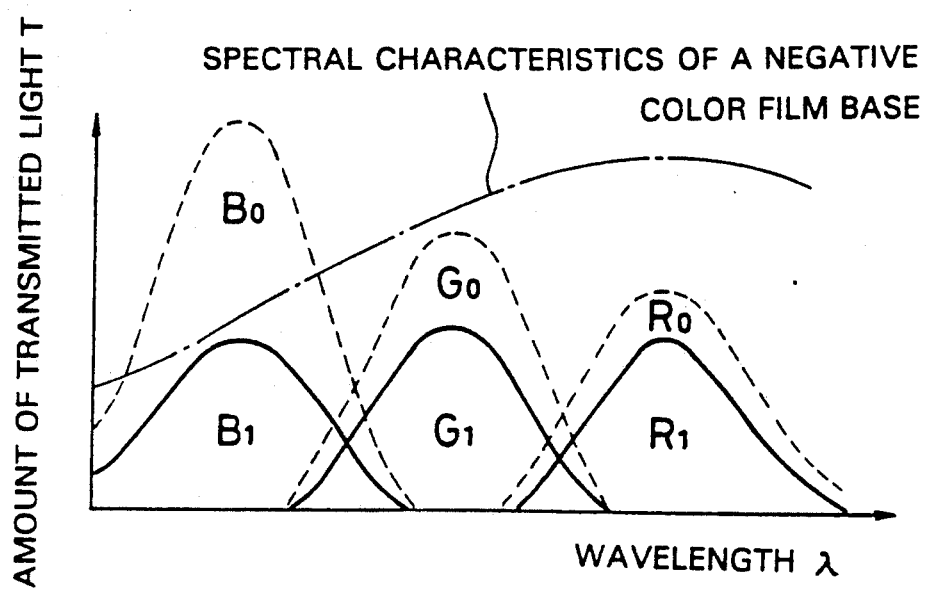
FIG. 4a is a graph showing spectral characteristics of the light transmitted through the dichroic prism 6 (solid line) obtained by using the halogen lamp as the light source when a negative color film is read.
Figure 4B:
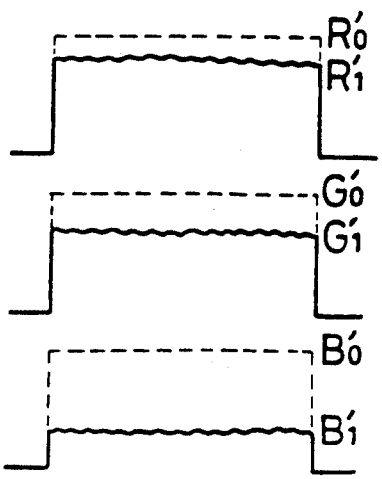
FIG. 4b shows white levels of the CCD line sensors $7_B$, $7_G$ and $7_R$ (solid line) when the negative color film is read.
Figure 5A:
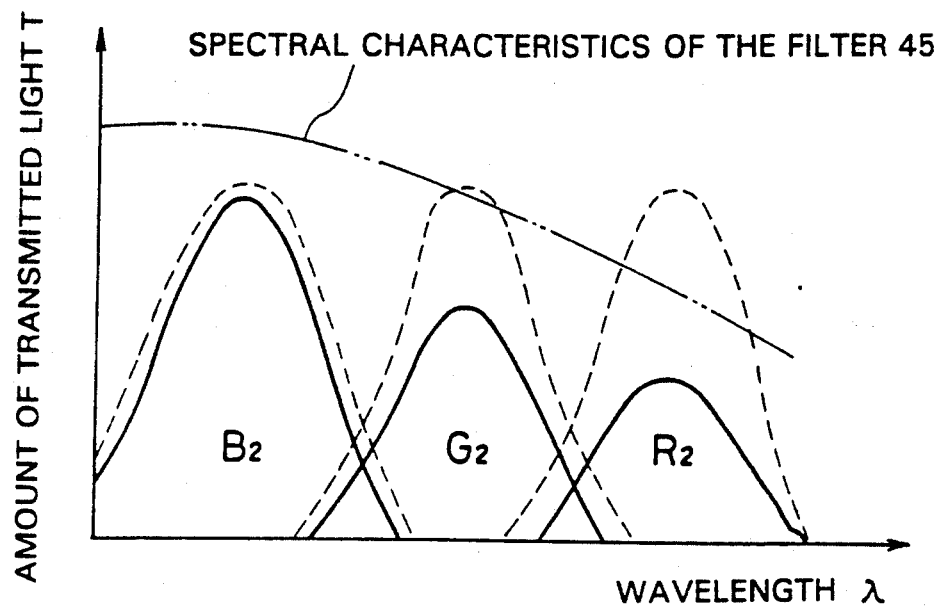
FIG. 5a is a graph showing spectral characteristics of the light transmitted through the dichroic prism 6 (solid line) obtained by using the halogen lamp as the light source when the negative color film is read using a filter 45.
Figure 5B:
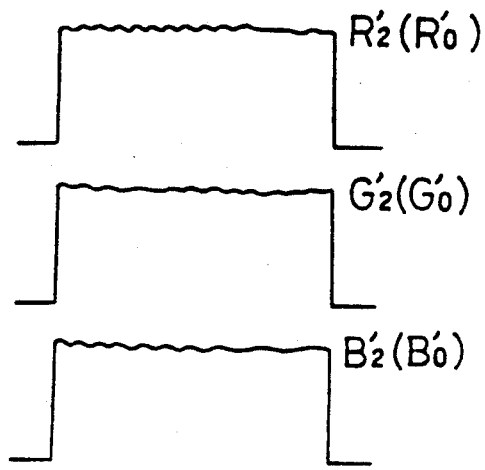
FIG. 5b shows white levels of the CCD line sensors $7_B$, $7_G$ and $7_R$ when the negative color film is read using the filter 45.

FIGS. 3a and 3b respectively show spectral characteristics $B_0$, $G_0$ and $R_0$ of the light transmitted through the dichroic prism 6 and white levels $B'_0$, $G'_0$ and $R'_0$ of the CCD line sensors $7_B$, $7_G$ and $7_R$ obtained concerning the three color components when a positive color film is on the table 2; FIGS. 4a (solid lines) and 4b respectively show spectral characteristics $B_1$, $G_1$ and $R_1$ and white levels $B'_1$, $G'_1$ and $R'_1$ obtained when a negative color film is on the table 2 with no filter provided; and FIGS. 5a (solid lines) and 5b respectively show spectral characteristics $B_2$, $G_2$ and $R_2$ and white levels $B'_2$, $G'_2$ and $R'_2$ obtained when the negative color film is on the table 2 with a filter 45 provided. In FIGS. 3a, 4a and 5a, the axis of ordinate indicates the amount of the light transmitted through the dichroic prism 6, and the axis of abscissa indicates the wavelength. The one-dot chain line of FIG. 4a shows the spectral characteristics of the base of the negative color film; and the two-dot chain line of FIG. 5a shows those of the filter 45.

When the light transmitted through the positive color film on the table 2 passes through the dichroic prism 6 which causes the light transmitted therethrough to have the spectral characteristics $B_0$, $G_0$ and $R_0$ (FIG. 3a), the CCD line sensors $7_B$, $7_G$ and $7_R$ have substantially equal white levels (FIG. 3b).

When the light transmitted through the negative color film passes through the dichroic prism 6 with no filter, there occurs the following problem. Due to the above-mentioned reddish fogging, the light intensity from the halogen lamp is lower than the light intensity obtained in the case of the positive color film in all the color components (FIG. 4a). The fact that the light intensity is lowered most in the blue component and least in the red component causes the white levels of the CCD line sensors to be lowered most in the blue component and least in the red component. As a result, the white levels of the three CCD line sensors, which are substantially equal in the case of the positive color film, indicate large difference from one another in the case of the negative color film.

One conceivable solution of the above problem is electrically amplifying only $B_1$ to the level of $R_1$, which is not much lower than $R_0$. However, since amplifying $B_1$ accompanies noise increase for the above-mentioned reason, the reading accuracy of the apparatus is impaired.

The filter 45 employed in this embodiment functions as described below. The light intensity from the light source 40 is raised as specified to increase the intensity of the light transmitted through the dichroic prism 6 up to the level of the dashed lines of FIG. 5a. Since the filter 45 has the spectral characteristics shown in FIG. 5a, the light transmitted through the dichroic prism 6 obtains the spectral characteristics $B_2$, $G_2$ and $R_2$ (FIG. 5a). Since these characteristics are almost the same as $B_0$, $G_0$ and $R_0$, the CCD line sensors $7_B$, $7_G$ and $7_R$ have the white levels $B'_2$, $G'_2$ and $R'_2$ (FIG. 5b), which are almost equal with $B'_0$, $G'_0$ and $R'_0$. Since the three white levels are substantially equal, the adverse influence of the reddish fogging can be prevented without fail.

The light intensity attenuation unit may be used together with the filter 45. The light intensity attenuation unit comprising a diffusion plate and an ND filter is attached to the connecting frame 42 so that the unit may be switchable with the filter 45. When the positive color film is on the table 2, the light intensity attenuation unit is located on the optical path, whereby lowering the light intensity for reading the positive color film. For reading the negative color film, the attenuation unit is retracted off the optical path, whereby raising the light intensity.

DETAILED DESCRIPTION OF THE VICINITY OF THE ORIGINAL TABLE 2

As shown in FIG. 1, the flatbed-scanning type image reading apparatus has a white reference plate unit 20 on an end portion of the table 2, the unit 20 being extended in the main scanning direction. The unit 20 is provided for shading compensation, which is required to compensate the non-uniformity in the sensitivity of CCDs of the light sensors and in the intensity of the light incident on the CCD line sensors.

Figure 6:
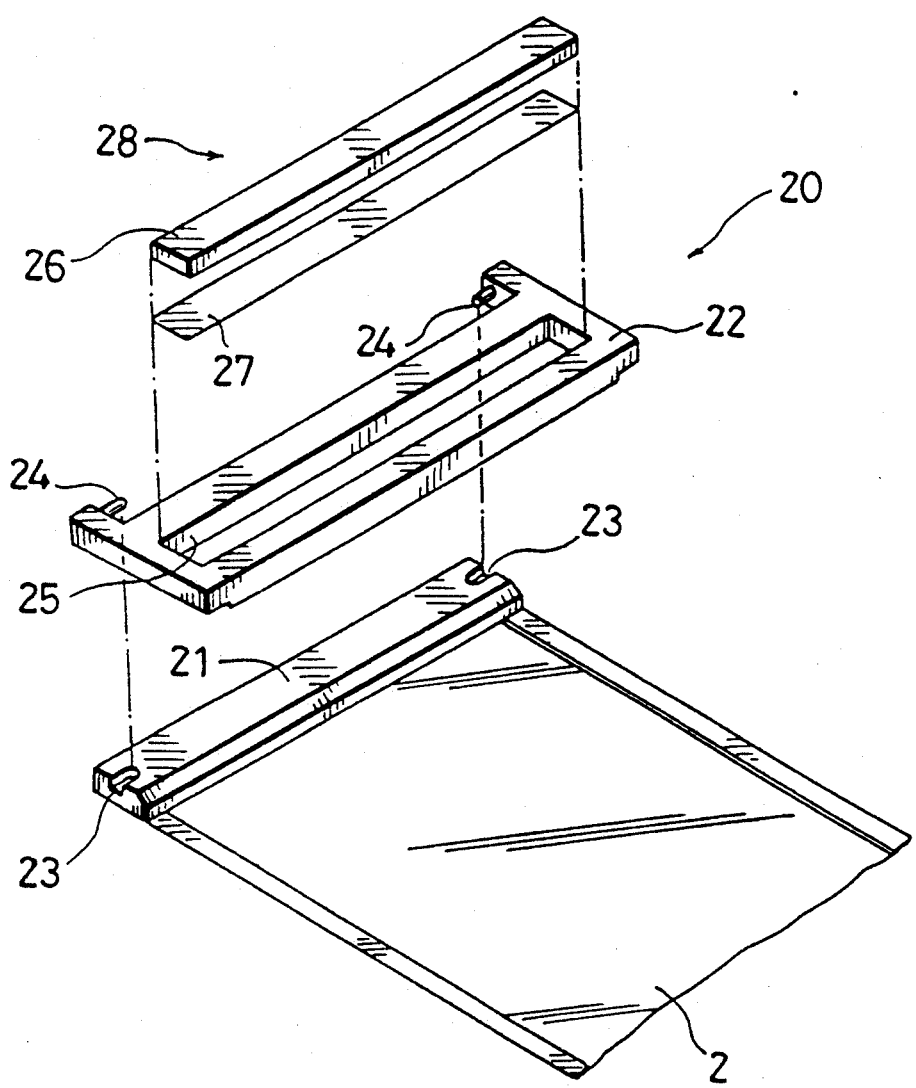
FIG. 6 is an exploded perspective view of a white reference plate unit 20.

The white reference plate unit 20 has a construction shown in FIG. 6. A specified-width unit supporter 21 having engaging grooves 23 at both ends thereof is provided on the end portion of the table 2. A plate supporter 22 having a rectangular shape extended in the main scanning direction is detachably engaged with the unit supporter 21 through internally-projecting pins 24 provided at both ends of the plate supporter 22, the pins 24 being inserted through the grooves 23. The plate supporter 22 has a slit 25 in a central portion thereof. Set in the slit 25 is a white reference plate 28 comprising a transparent float glass 26 and an unexposed but developed negative color film 27 pasted on a bottom surface of the glass 26. The reference plate 28 is inserted so that the negative color film 27 and the color film on the table 2 may be on the same flat. While the negative color film 27 is employed when the color film on the table 2 is negative, a white reference plate consisting only of the float glass is used when the color film on the table 2 is positive.

In the above construction, the shading compensation for the negative color film is proceeded in the following way. The density of the white reference plate 28, the density being substantially the same as the lowest density of the image to be read, is detected by the CCD line sensors $7_B$, $7_G$ and $7_R$. Then, output levels of the CCDs of the above line sensors are obtained. The above-mentioned non-uniformity is compensated by executing compensation calculation based on the obtained output levels.

It is owing to the negative color film 27 pasted on the float glass 26 that the white reference plate 28 has the density which is substantially the same as the lowest density of the image to be read. The negative color film 27 is not necessary when the color film is positive since the least densified portion of the positive color film is transparent.

Embodiment II

Figure 7:
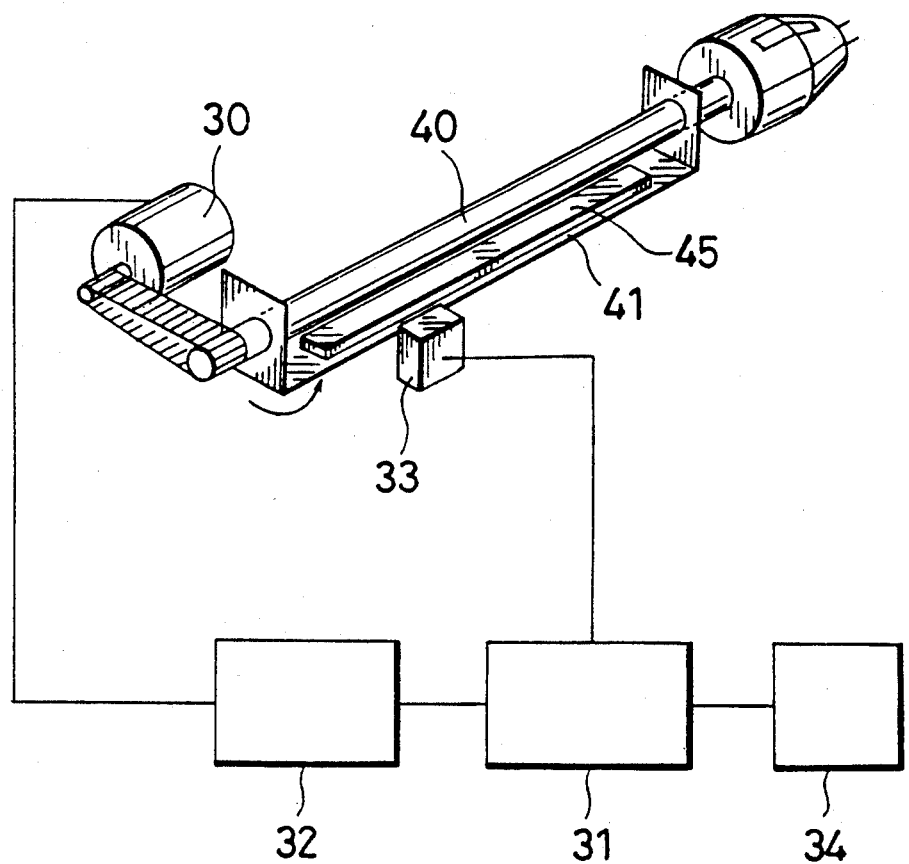
FIG. 7 is a view of a partial construction of a second embodiment according to this invention.

FIG. 7 is a partial view of a second embodiment according to this invention, wherein the filter 45 is moved between the functioning position and the retracting position automatically.

The second embodiment has the same construction as the first embodiment except that the image reading apparatus further comprises a motor 30 for moving the filter 45 and a sensor 33 including a proximity switch disposed in the vicinity of the retracting position of the filter 45.

The image reading apparatus as the second embodiment is connected to an image processing apparatus 31, a motor driving circuit 32 and a keyboard 34, and is operated in the following way.

When the operator informs the image processing apparatus 31 through the keyboard 34 that a positive color film, for example, has been placed on the table 2, the image processing apparatus 31 drives the motor 30 through the motor driving circuit 32, whereby moving the filter 45 to the retracting position. When the sensor 33 detects the filter 45 at the retracting position, the motor 30 is stopped.

The sensor 33 may detect that the above-mentioned light intensity attenuation unit is retracted instead of the filter 45.

When the sensor 33 detects the filter 45 or the attenuation unit is retracted, such information may be notified to the operator through a display.

The filter 45 and the attenuation unit may each have a sensor for detecting their retraction, wherein which type film, positive or negative, is placed on the table 2 is displayed based on the detection result of the sensors.

In the first and the second embodiments, the light from the light source 40 is separated into the components of the three primary colors, and then read as image data by the CCD line sensors $7_B$, $7_G$ and $7_R$. Instead of providing three CCD line sensors, however, there may be provided only one CCD line sensor and a rotating filter having blue, green and red portions on the optical path between the light source 40 and the CCD line sensor. In this construction, the light is separated into the color components by the rotation of the filter, and the color components are read one by one by the CCD line sensor.

Still another conceivable construction is that blue, green, and red fluorescent lamps are provided instead of the filter. In this construction, the light from the light source 40 is separated by lighting up the fluorescent lamps one by one, and the obtained color components are read one by one by one CCD line sensor.

Embodiment III

Figure 8:
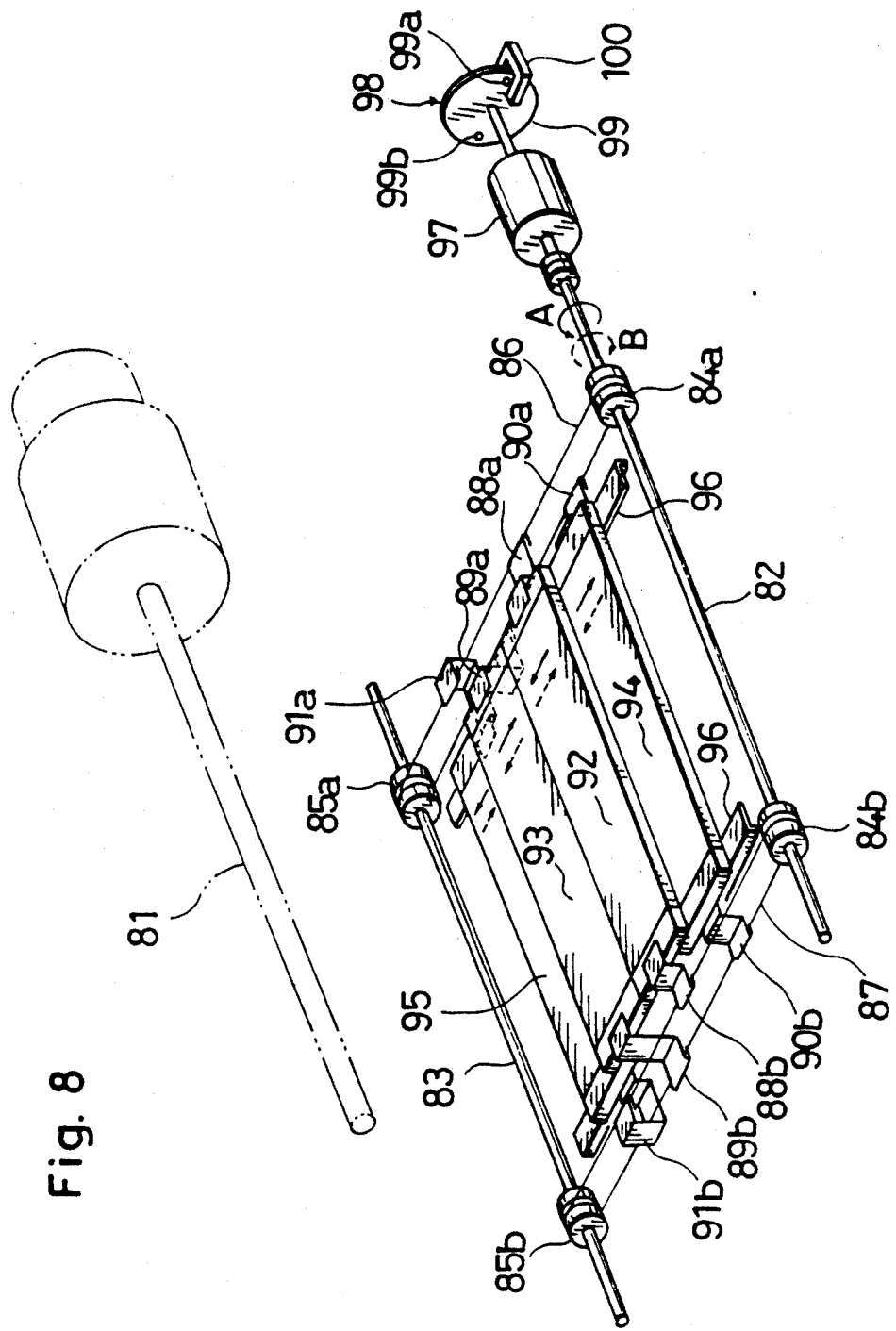
FIGS. 8 through 10 are perspective views of lamp units of third, fourth and fifth embodiments according to this invention.

FIG. 8 shows a lamp unit of a third embodiment according to this invention. This and all the following embodiments have the same construction as the first embodiment except the lamp unit. In the third embodiment, first filters 92 and 93 for compensating the reddish fogging and second filters 94 and 95 for attenuating the light intensity are automatically located on the optical path alternately.

The lamp unit comprises a linear light source 81 and two shafts 82 and 83 provided in parallel with and below the light source 81. The shaft 82 has pulleys 84a and 84b at both ends thereof; and the shaft 83 has pulleys 85a and 85b at both ends thereof. The pulleys 84a and 85a are connected to each other through a hooped wire 86; and the pulleys 84b and 85b are connected to each other through a hooped wire 87. The first filter 92 and the second filter 95 are extended between and fixed to upper portions of the wires 86 and 87 by pairs of connectors 88a and 88b, and 91a and 91b, respectively. The first filter 93 and the second filter 94 are extended between and fixed to lower portions of the wires 86 and 87 by pairs of connectors 89a and 89b, and 90a and 90b, respectively. The lengths of the above connectors are adjusted appropriately so as to set the first filters 92 and 93 one step up from the second filters 94 and 95. The second filters 94 and 95 are horizontally slidable on guides 96. The first filters 92 and 93 are horizontally slidable on the filters 94 and 95.

In all the embodiments in this specification, "WRATTEN GELATIN FILTER 80C" produced by Eastman Kodak Company is used as the first filter (or the filter wherein only one filter is used). However, other types of filters can of course be used if only they have the spectral characteristics as indicated by the one-dot chain line of FIG. 5a, namely, the spectral characteristics substantially inverse to those of the base of the negative color film (the one-dot chain line of FIG. 4a). As the second filter, an ND filter is used.

In the above construction, when the shaft 82 is rotated in a direction of an arrow A, the first filters 92 and 93 approach each other while the second filters 94 and 95 move away from each other. When the shaft 82 is rotated in a direction of an arrow B, the first filters 92 and 93 move away from each other while the second filters 94 and 95 approach each other.

Connected to the shaft 82 is a motor 97 for rotating the shaft 82. The motor 97 is also connected to a detecting device 98. The detecting device 98 comprises a disc 99 connected to an output shaft of the motor 97 and a photosensor 100 for detecting the through-holes 99a and 99b of the disc 99.

The through-holes 99a and 99b are made at appropriate positions so that the through-hole 99a may be detected by the photosensor 100 when the first filters 92 and 93 approach and contact each other and that the through-hole 99b may be detected by the photosensor 100 when the second filters 94 and 95 approach and contact each other.

The lamp unit having the above construction is operated in the following way.

When it is informed by the operator that a negative color film is placed on the table 2, the motor 97 is driven in the direction of the arrow A, whereby the first filters 92 and 93 approach and contact each other, namely, are located on the optical path for compensating the reddish fogging. The through-hole 99a is detected by the photosensor 100, whereby the motor 97 is stopped.

When a positive color film is placed on the table 2, the motor 97 is driven in the direction of the arrow B, whereby the second filters 94 and 95 approach and contact each other, namely, are located on the optical path for attenuating the light intensity. The through-hole 99b is detected by the photosensor 100, whereby the motor 97 is stopped.

Embodiment IV

Figure 9:
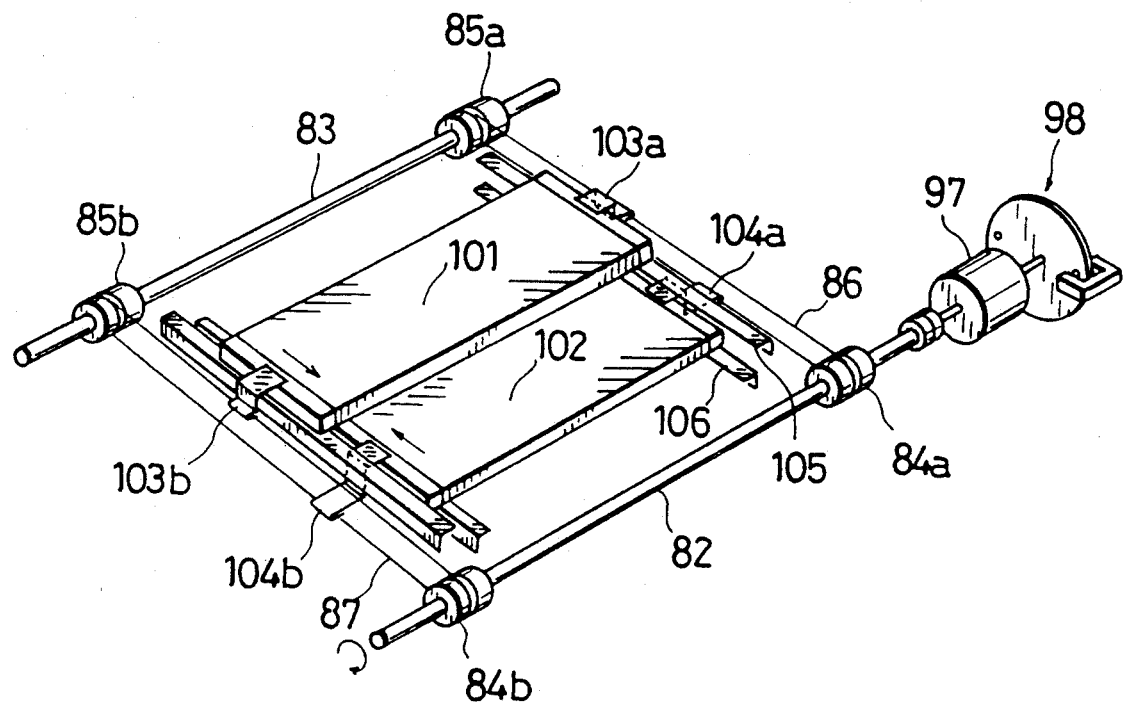

FIG. 9 shows a lamp unit of a fourth embodiment according to this invention.

The lamp unit of the fourth embodiment has the same construction as the lamp unit of the third embodiment except that one first filter 101 and one second filter 102 are provided instead of two each. The first filter 101 is extended between and fixed to upper portions of the wires 86 and 87 by connectors 103a and 103b; and the second filter 102 is extended between and fixed to lower portions of the wires 86 and 87 by connectors 104a and 104b. In this construction, the first filter 101 and the second filter 102 are moved in opposite directions from each other. The first filter 101 and 102 are horizontally slidable on guides 105 and 106, respectively.

The lamp unit having the above construction is operated by the same principle as in the third embodiment.

Embodiment V

Figure 10:
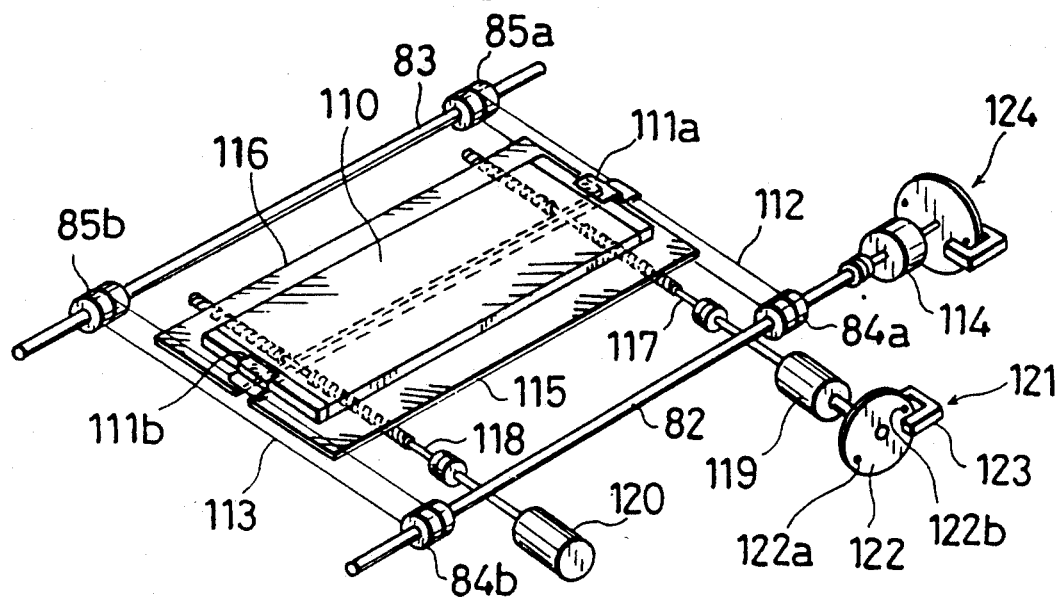

FIG. 10 shows a lamp unit of a fifth embodiment according to this invention.

The lamp unit of the fifth embodiment comprises one filter 110 and a light intensity adjusting unit. The shafts 82 and 83 and the pulleys 84a, 84b, 85a and 85b are the same as those of the third embodiment.

The filter 110 is extended between and fixed to hooped wires 112 and 113 by connectors 111a and 111b, the hooped wire 112 being extended between the pulleys 84a and 85a and the hooped wire 113 being extended between the pulleys 84b and 85b. The filter 110 is horizontally slidable by the rotation of a motor 114. The motor 114 is connected to a detecting device 123.

Figure 11:
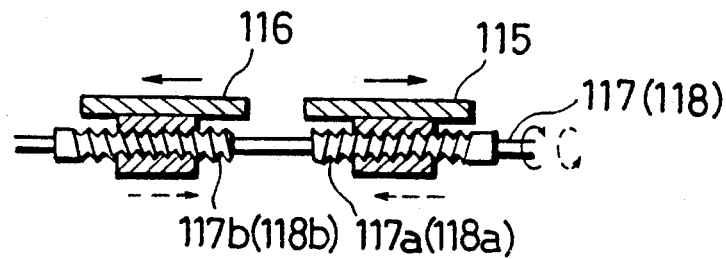
FIG. 11 is a partial cross sectional view of FIG. 10.

The light intensity adjusting unit comprises two plates 115 and 116 provided below the filter 110, shafts 117 and 118 each screwed through both of the plates 115 and 116. The unit further comprises motors 119 and 120 respectively for rotating the shafts 117 and 118, a detecting device 121 for detecting how far the plates 115 and 116 are distanced from each other, the device 121 comprising a disc 122 and a sensor 123. As illustrated in FIG. 11, the shaft 117 has two screw portions 117a and 117b, the portion 117a being inserted through the plate 115 and the portion 117b being inserted through the plate 116. In the same way, the shaft 118 has two screw portions 118a and 118b, the portion 118a being inserted through the plate 115 and the portion 118b being inserted through the plate 116.

The screw portions 117a and 117b are threaded oppositely from each other, the screws 118a and 118b are threaded oppositely from each other, and the screws 117a and 118a are threaded in the same direction. In this construction, the plates 115 and 116 are moved in the opposite direction from each other when the shafts 117 and 118 are rotated.

The motors 119 and 120 are driven in synchronization in such manner that the plates 115 and 116 may have a larger distance therebetween when the filter 110 is located on the optical path than when the filter 110 is retracted. The distance which the plates 115 and 116 have therebetween when the filter 110 is retracted from the optical path is adjusted so that the intensity of the light transmitted through a positive color film with no filter used may be substantially the same as that transmitted through a negative color film with the filter 110 located on the optical path.

The above distance adjustment is realized by making two holes 122a and 122b in the disc 122 at appropriate positions.

The lamp unit having the above construction is operated in the following way.

When a negative color film is placed on the table 2, the motor 114 is driven to locate the filter 110 on the optical path, and the motor 119 is driven to move the plates 115 and 116 away from each other until the hole 122a is detected. In this state, the filter 110 compensates the reddish fogging.

When a positive color film is placed on the table 2, the motor 114 is driven to locate the filter 110 off the optical path. The motor 119 is driven to move the plates 115 and 116 closer to each other until the hole 122b is detected, whereby attenuating the intensity of the light from the light source 81.

The detecting device 124 is operated by the same principle in the third embodiment.

Embodiment VI

Figure 12:
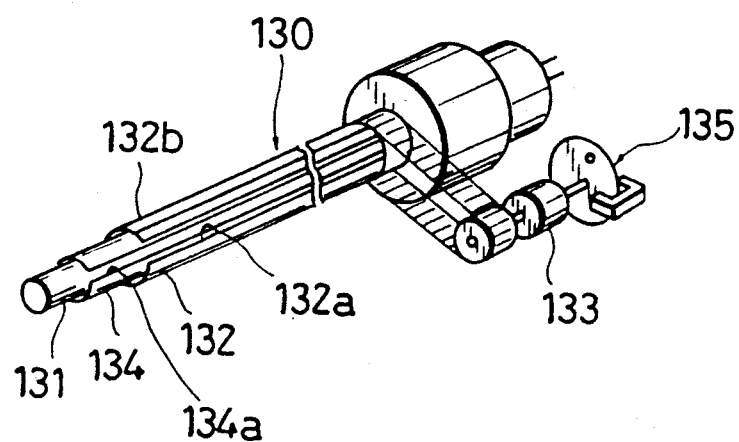

FIG. 12 shows a lamp unit of a sixth embodiment according to this invention.

The lamp unit comprises a linear light source 130 including a main portion 131. A linear reflective case 134 covers the main portion 131, making an opening 134a, the linear reflective case 134 acting as an optical output portion of the light source 130. A linear cover 132 having a transparent filter portion 132b rotatably covers the reflective case 134, making a slit 132a.

The lamp unit further comprises a motor 133 connected to the light source 130 through a hooped belt and a detecting device 135 including a sensor and a disc having a first and a second through-holes.

The first and the second through-holes are made at appropriate positions so that the first through-hole may be detected when the slit 134a is appropriately aligned with the opening 134a and that the second through-hole may be detected when the opening 134a is covered with the filter portion 134b.

The lamp unit having the above construction is operated in the following way.

When a positive color film is placed on the table 2, the motor 133 is driven to rotate the linear cover 132 until the first through-hole is detected, whereby attenuating the light intensity from the light source 130.

When a negative color film is placed on the table 2, the motor 133 is driven to rotate the linear cover 132 until the second through-hole is detected, whereby compensating the reddish fogging.

It should be noted that the opening 134a is directed downward towards the table 2 in practice although the opening 134a is directed upward in FIG. 12 for easier explanation.

Embodiment VII

Figure 13:
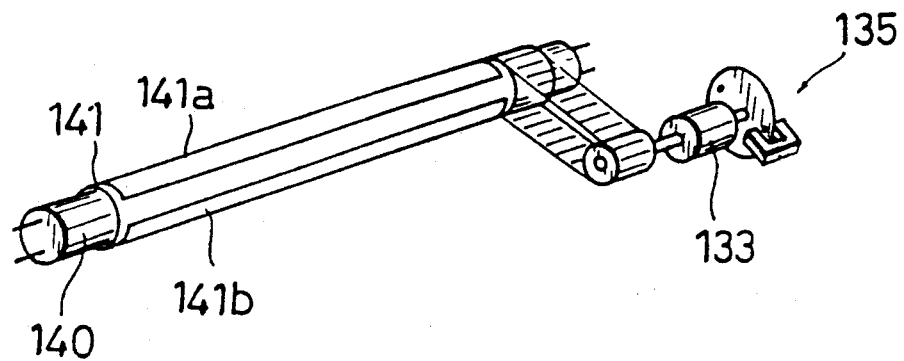

FIG. 13 shows a lamp unit of a seventh embodiment according to this invention.

The lamp unit of the seventh embodiment comprises a linear fluorescent light source 140 and a transparent linear cover 141, which covers the light source 140. The cover 141 has a first filter 141a and a second filter 141b on a peripheral surface thereof.

Figure 14:
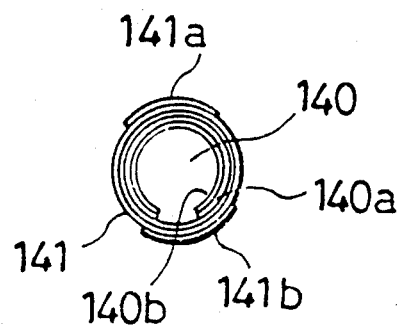
FIG. 14 is an enlarged cross sectional view of FIG. 13.

Since the fluorescent light is diffused over 360°, it is desirable for practical use to form a reflective film 140a on a peripheral surface of a fluorescent body 140b except a portion thereof (FIG. 14).

The motor 133 and the detecting device 135 are the same with those of the sixth embodiment.

The lamp unit having the above construction is operated in the following way.

When a negative color film is placed on the table 2, the motor 133 is driven to rotate the linear cover 141 to locate the first filter 141a on the optical path, whereby the first filter 141a compensates the reddish fogging.

When a positive color film is placed on the table 2, the motor 133 is driven to rotate the linear cover 141 to locate the second filter 141b on the optical path, whereby the second filter 141b attenuates the light intensity from the light source 140. The detecting device 135 operates in the same way as in the sixth embodiment.

In all the above embodiments except the seventh embodiment, the linear light source has a halogen lamp at an end thereof. However, the halogen lamp may be replaced with a fluorescent lamp.

In all the above embodiments, the filter is moved from the retracting position to the optical path between the original film and the light source. Instead, the above filter may also be moved to the optical path between the original film and the optical image reading unit.

Although the present invention has been fully described by way of embodiments with references to the accompanying drawings, it is to be noted that various changes and modifications will be apparent to those skilled in the art. Therefore, unless otherwise such changes and modifications depart from the scope of the present invention, they should be construed as being included therein.

What is claimed is:

1. A flatbed-scanning type image reading apparatus for reading an image of an original color film by separating the image into a plurality of color components, said apparatus comprising:
    a transparent original table having a flat surface on which an original color film is to be placed;
    a linear light source for emitting light that is directed to impinge upon the original color film placed on said table at least over a main scanning scope;
    optical image reading means for reading a light transmitted through the original color film as a plurality of color components of different wavelengths;
    sub-scanning moving means for relatively moving said linear light source and said table in a sub-scanning direction;
    an optical filter having spectral characteristics substantially inverse to spectral characteristics of a base of a negative color film; and
    filter switching means for moving said optical filter selectively to a first position on an optical path between said linear light source and said table and a second position off the optical path in accordance with the type of the original color film placed on said table.

2. An apparatus of claim 1, wherein said optical image reading means further comprises color separating means for separating the light transmitted through the original color film into color components of the three primary colors of blue, green and red and photoelectric converting means for converting each color component into an electric signal.

3. An apparatus of claim 2, wherein the color separating means is a dichroic prism, and the photoelectric converting means are three CCD line sensors.

4. An apparatus of claim 2, wherein said sub-scanning moving means is controlled to relatively move said linear light source and said table in the sub-scanning direction in association with a speed with which said optical image reading means reads all the color components.

5. An apparatus of claim 1, wherein said optical filter is movable in the sub-scanning direction between said linear light source and said table.

6. An apparatus of claim 1, wherein said filter switching means pivots said optical filter selectively to the first position and the second position in accordance with the type of the original color film on said table.

7. An apparatus of claim 5, further comprising light intensity adjusting means for adjusting an intensity of the light running from said linear light source in association with the position of said optical filter.

8. An apparatus of claim 7, wherein the light intensity adjusting means is an attenuating filter, which is controlled to be on the optical path between said linear light source and said table when said optical filter is at the second position.

9. An apparatus of claim 7, wherein the light intensity adjusting means is a member having a slit, the member being controlled to locate the slit on the optical path between said linear light source and said table when said optical filter is at the second position.

10. An apparatus of claim 7, wherein the light intensity adjusting means is slit size adjusting means for adjusting a slit size to a first size when said optical filter is at the first position and to a second size when said optical filter is at the second position.

11. An apparatus of claim 1, further comprising a white reference plate provided above said table, the white reference plate having an unexposed but developed negative color film when the original color film on said table is negative.

12. A flatbed-scanning type image reading apparatus for reading an image of an original color film by separating the image into a plurality of color components, said apparatus comprising:
    a transparent original table having a flat surface on which an original color film is to be placed;
    a linear light source for emitting light that is directed to impinge upon the original color film placed on said table at least over a main scanning scope;
    optical image reading means for reading a light transmitted through the original color film placed on said table at least over a main scanning scope;
    optical image reading means for reading a light transmitted through the original color film as color components of the three primary colors;
    sub-scanning moving means for relatively moving said linear light source and said table in a sub-scanning direction;
    an optical filter having spectral characteristics substantially inverse to spectral characteristics of a base of a negative color film;
    filter switching means for moving said optical filter to a first position on an optical path between said linear light source and said table when the original color film on said table is negative and to a second position off the optical path when the original color film on said table is positive; and
    light intensity adjusting means for substantially equalizing an intensity of the light incident on said optical image reading means obtained when the original color film on said table is positive and the intensity of the above light obtained when the original color film on said table is negative with said optical filter located at the first position.

13. An apparatus of claim 12, wherein said light intensity adjusting means is an attenuating filter, which is controlled to be on the optical path between said linear light source and said table when said optical filter is at the second position.

14. An apparatus of claim 12, wherein said light intensity adjusting means is a member having a slit, the member being controlled to locate the slit on the optical path between said linear light source and said table when said optical filter is at the second position.

15. An apparatus of claim 12, wherein said light intensity adjusting means is slit size adjusting means for adjusting a slit size to a first size when said optical filter is at the first position and to a second size when said optical filter is at the second position.

16. A flatbed-scanning type image reading apparatus for reading an image of an original color film by separating the image into a plurality of color components, said apparatus comprising:
   a transparent original table having a flat surface on which an original color film is to be placed;
   a linear light source for emitting light that is directed to impinge upon the original color film placed on said table at least over a main scanning scope;
   optical image reading means for reading a light transmitted through the original color film as color components of the three primary colors;
   sub-scanning moving means for relatively moving said linear light source and said table in a sub-scanning direction;
   a first optical filter having spectral characteristics substantially inverse to spectral characteristics of a base of a negative color film;
   a second optical filter for adjusting an intensity of the light incident on said optical image reading means when the original color film on said table is positive; and
   filter switching means for locating said first optical filter on the optical path between said linear light source and said table when the original color film on said table is negative and for locating said second optical filter on the optical path when the original color film on said table is positive.

17. An apparatus of claim 16, wherein said second optical filter is an ND filter.

18. A method for reading an image of an original color film in a flatbed-scanning type image reading apparatus, the method comprising the steps of:
   setting an original color film on an original table;
   locating an optical filter having spectral characteristics substantially inverse to spectral characteristics of a base of a negative color film on an optical path between a linear light source and the table when the original color film on the table is negative, and retracting the optical filter off the optical path when the original color film on the table is positive; and
   relatively moving the linear light source and the table in a sub-scanning direction to read the image of the original color film on the table.

19. A method of claim 18, further comprising the step of reading a white reference plate provided above the table.

20. A method of reading an image of an original color film in a flatbed-scanning type image reading apparatus, the method comprising the steps of:
   setting an original color film on an original table;
   locating a first optical filter having spectral characteristics substantially inverse to spectral characteristics of a base of a negative color film on an optical path between a linear light source and the table when the original color film on the table is negative, and locating a second optical filter on the optical path when the original color film on the table is positive; and
   relatively moving the linear light source and the table in a sub-scanning direction to read the image of the original color film on the table.

21. A method of claim 20, further comprising the step of reading a white reference plate provided above the table.

* * * * *